(12) United States Patent
Park et al.

(10) Patent No.: US 12,490,368 B2
(45) Date of Patent: Dec. 2, 2025

(54) JUNCTION TEMPERATURE ESTIMATION DEVICE AND PLASMA GENERATING SYSTEM INCLUDING THE SAME

(71) Applicant: SAMSUNG ELECTRONICS CO., LTD., Suwon-si (KR)

(72) Inventors: Donghoon Park, Suwon-si (KR); Kwangyoung Jung, Suwon-si (KR); Seunghun Kim, Suwon-si (KR); Jung-Soon Bok, Suwon-si (KR); Jiho Uh, Suwon-si (KR); Hyunjoon Ohn, Suwon-si (KR); WonHee Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 18/738,968

(22) Filed: Jun. 10, 2024

(65) Prior Publication Data
US 2025/0106975 A1   Mar. 27, 2025

(30) Foreign Application Priority Data
Sep. 25, 2023   (KR) .......................... 10-2023-0128196

(51) Int. Cl.
*H05H 1/24*   (2006.01)
*G01K 7/00*   (2006.01)

(52) U.S. Cl.
CPC ................. *H05H 1/24* (2013.01); *G01K 7/00* (2013.01)

(58) Field of Classification Search
CPC .................................. H05H 1/24; G01K 7/00
See application file for complete search history.

(56) References Cited

U.S. PATENT DOCUMENTS

| 7,356,441 B2 | 4/2008 | Kerkman et al. |
| 8,625,283 B2 | 1/2014 | Ioannidis |
| 9,536,713 B2 | 1/2017 | Van Zyl et al. |
| 10,337,930 B2 | 7/2019 | Hasan et al. |

(Continued)

FOREIGN PATENT DOCUMENTS

| CN | 107979909 A | * | 5/2018 | .......... H05H 1/4645 |
| CN | 208675572 U | * | 3/2019 | |

(Continued)

*Primary Examiner* — Adam D Houston
(74) *Attorney, Agent, or Firm* — Sughrue Mion, PLLC

(57) ABSTRACT

Provided is a plasma generating system including: a resonant inverter including a switching circuit and configured to generate a device output current and a device output voltage, and to have a switching frequency based on an input DC current and an input DC voltage; a plasma source configured to generate a plasma based on the device output current and the device output voltage; a controller configured to control the switching frequency of the resonant inverter based on a value of the input DC current, a value of the input DC voltage, a value of the device output current, and a value of the device output voltage; and a junction temperature estimator configured to: estimate a current output from the switching circuit based on the value of the input DC voltage, the value of the device output current, and the value of the device output voltage, generate an inverted current estimate value, and estimate a junction temperature of the switching circuit based on the inverted current estimate value.

20 Claims, 8 Drawing Sheets

(56) References Cited

U.S. PATENT DOCUMENTS

| | | | |
|---|---|---|---|
| 10,495,519 B2 | 12/2019 | Sjoroos et al. | |
| 2003/0123268 A1* | 7/2003 | Pai .................... | H02M 7/53871 |
| | | | 363/131 |
| 2012/0113696 A1* | 5/2012 | Voigtlaender ..... | H02M 7/53871 |
| | | | 363/71 |
| 2012/0221287 A1 | 8/2012 | Ioannidis | |
| 2017/0064802 A1* | 3/2017 | Tran ..................... | H02M 7/537 |
| 2018/0005857 A1* | 1/2018 | Zhang .................. | H01J 37/321 |
| 2025/0106975 A1* | 3/2025 | Park ...................... | G01K 7/427 |

FOREIGN PATENT DOCUMENTS

| | | | | |
|---|---|---|---|---|
| CN | 109597966 A | | 4/2019 | |
| CN | 110082660 A | | 8/2019 | |
| CN | 110765601 A | | 2/2020 | |
| JP | 2022531634 A | * | 7/2022 | .......... H02M 1/0025 |
| KR | 20100004452 A | * | 1/2010 | ............. H02M 1/14 |
| KR | 10-2520851 B1 | | 4/2023 | |

\* cited by examiner

JUNCTION TEMPERATURE ESTIMATION DEVICE AND PLASMA GENERATING SYSTEM INCLUDING THE SAME

CROSS-REFERENCE TO RELATED APPLICATIONS

This application is based on and claims priority under 35 U.S.C. § 119 to Korean Patent Application No. 10-2023-0128196, filed on Sep. 25, 2023, in the Korean Intellectual Property Office, the disclosure of which is incorporated by reference herein in its entirety.

BACKGROUND

1. Field

The disclosure relates to a junction temperature estimation device, and more particularly, to a managing device capable of estimating a junction temperature inside a power supply device including a switching circuit and managing the power supply device.

2. Description of Related Art

In general, IGBT (Insulated Gate Bipolar Transistor) switching elements are high-power switching semiconductor elements that may quickly perform a switching function to block or allow electrical flow.

The switching function that blocks or allows the flow of electricity may be implemented with other components or circuits, but products that require precise operation require dedicated components with fast operation speed and low power loss.

When an inverter using a switching element is used to convert a DC voltage to an alternating current power with high frequency and high voltage level, such as when using a ferromagnetic core inductive plasma source to generate a high-density plasma, failure of the switching elements may occur due to an increase in the amount of heat generated by the inverter.

To estimate the junction temperature, methods for estimating the junction temperature by measuring the output current of a switching circuit composed of switching elements are being studied. However, in the case of full-bridge resonant inverters, since the switching frequency is several times higher than the typical bandwidth of a current sensor, it is difficult to directly measure the current output from switching circuits of inverters.

SUMMARY

Provided is a plasma generating system that manages a plasma generating device by estimating a junction temperature of a resonant inverter in real time.

Further, provided is a junction temperature estimation device capable of estimating a junction temperature in real time.

Further, provided is a managing device that manages a power supply device by estimating a junction temperature of the power supply device including a full-bridge resonant inverter in real time.

According to an aspect of the disclosure, a plasma generating system includes: a resonant inverter including a switching circuit and configured to generate a device output current and a device output voltage, and to have a switching frequency based on an input DC current and an input DC voltage; a plasma source configured to generate a plasma based on the device output current and the device output voltage; a controller configured to control the switching frequency of the resonant inverter based on a value of the input DC current, a value of the input DC voltage, a value of the device output current, and a value of the device output voltage; and a junction temperature estimator configured to: estimate a current output from the switching circuit based on the value of the input DC voltage, the value of the device output current, and the value of the device output voltage, generate an inverted current estimate value, and estimate a junction temperature of the switching circuit based on the inverted current estimate value.

According to an aspect of the disclosure, a junction temperature estimation device configured to estimate a junction temperature of a power supply device including a resonant inverter, includes: at least one processor; at least one memory storing at least one instruction, which when executed by the at least one processor, causes the junction temperature estimation device to: generate an inverted current estimate value by estimating a current output by a switching circuit of the resonant inverter based on a value of a device output current generated by the resonant inverter and a value of a device output voltage generated by the resonant inverter, and estimate the junction temperature of the switching circuit based on the inverted current estimate value.

According to an aspect of the disclosure, a plasma generating system includes: a plasma generating device including a plasma source configured to generate a plasma based on a device output current and a device output voltage input from a power supply device; and a managing device configured to: generate an inverted current estimate value by estimating a current output from a switching circuit included in a resonant inverter of the power supply device based on a value of the device output current and a value of the device output voltage, estimate a junction temperature of the switching circuit based on the inverted current estimate value, and perform a management operation on the plasma generating device based on the estimated junction temperature.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

As used herein, the terms "device" or "unit" refer to any combination of software, firmware, and/or hardware configured to perform functions and operations described herein. For example, software may be implemented as a software package, code and/or set of instructions or instructions, and hardware, for example, may include hardwired circuitry, programmable circuitry, state machine circuitry, and/or a single or any combination, or assembly of firmware that stores instructions executed by programmable circuitry.

It will be understood that when an element is referred to as being "connected" with or to another element, it can be directly or indirectly connected to the other element.

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

Herein, the expressions "at least one of a, b or c" and "at least one of a, b and c" indicate "only a," "only b," "only c," "both a and b," "both a and c," "both b and c," and "all of a, b, and c."

It will be understood that, although the terms first, second, third, etc., may be used herein to describe various elements, is the disclosure should not be limited by these terms. These terms are only used to distinguish one element from another element.

As used herein, the singular forms "a," "an" and "the" are intended to include the plural forms as well, unless the context clearly indicates otherwise.

Hereinafter, embodiments of the present disclosure may be described in detail.

Figure 1:
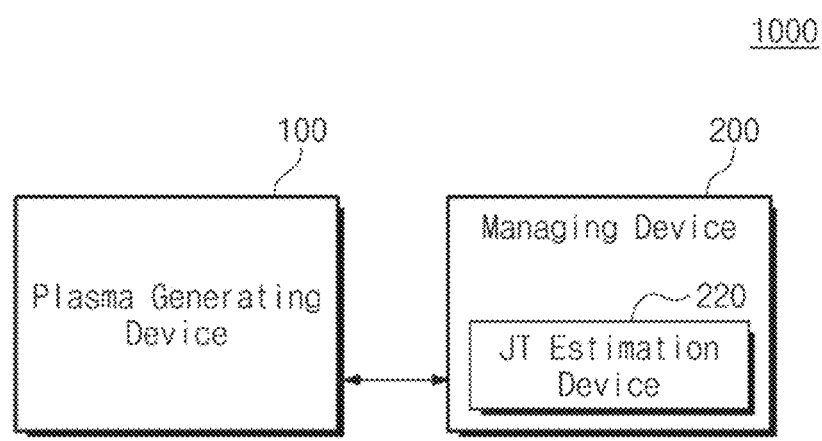
FIG. 1 is a block diagram illustrating a plasma generating system, according to an embodiment of the present disclosure.

FIG. 1 is a block diagram illustrating a plasma generating system, according to an embodiment of the present disclosure.

Referring to FIG. 1, a plasma generating system 1000 may include a plasma generating device 100 and a managing device 200.

The plasma generating device 100 may be configured to generate a plasma. The plasma generated by the plasma generating device 100 may be a high-density plasma. The high-density plasma may mean a plasma with a high ratio of charged particles composing the plasma. For example, the high-density plasma may mean a plasma composed of 85-95% neutral gas and 5-15% charged particles.

The plasma generating device 100 may include a power supply device and a plasma source. The power supply device may be configured to generate power that is provided to the plasma source. The detail configuration and operation of the plasma generating device 100 will be described later with reference to FIGS. 2 and 3.

The power supply device may include a switching circuit including a plurality of switching elements. As a junction temperature of the switching elements increases due to heat generated during operation of the power supply device, the possibility of defects occurring in the power supply device and the plasma generating device 100 may increase.

As used herein, the junction temperature may refer to the temperature at the portion indicating the highest temperature inside the power supply device. For example, the junction temperature may refer to the temperature of a switching element included inside the power supply device.

The managing device 200 may be configured to manage the plasma generating device 100. For example, the managing device 200 may be configured to manage the power supply device included in the plasma generating device 100.

The managing device 200 may include a junction temperature estimation device 220. The junction temperature estimation device 220 may be configured to estimate the junction temperature of the switching element included in the power supply device in real time based on sensor information of the plasma generating device 100. The sensor information may include information used to control the plasma generating device 100. For example, the sensor information may include values of a DC voltage and a DC current generated from the power supply device of the plasma generating device 100, and values of a device output voltage and a device output current output from the power supply device.

The managing device 200 may be configured to prevent failure of the plasma generating device 100 by performing a management operation on the power supply device based on the estimated junction temperature. For example, the managing device 200 may be configured to perform a management operation to prevent carbonization of switching elements included in the power supply device.

In an embodiment, the managing device 200 may perform a management operation on the plasma generating device 100 before the estimated junction temperature reaches a specific critical temperature. For example, a specific critical temperature may be the maximum temperature at which all switching elements included in the power supply may be operated. For example, the management operation may include blocking power supplied to the plasma generating device 100 or the inverter and/or performing a cooling process.

The switching element may be provided inside a semiconductor package surrounded by a plastic mold, and unless a temperature sensor is mounted inside the semiconductor package, direct measurement of the switching element may not be possible.

When using a ferromagnetic core inductive plasma source to generate the high-density plasma, a full-bridge resonant inverter including a resonance circuit may be used to provide high-frequency and high-voltage power to the plasma source.

The full-bridge resonant inverter is intended to control the power input to the plasma source, and may not include a separate current sensor within the inverter. Additionally, when the switching frequency of the full-bridge resonant inverter (e.g., several hundred kHz or more) is several times higher than the typical bandwidth (e.g., several tens of kHz) of the current sensor, it is difficult to directly measure the current output from the switching circuit of the inverter.

In the case of an embodiment according to the present disclosure, even if a separate sensor is not provided inside the inverter, the junction temperature may be estimated based on a device output voltage and a device output current, which are voltages input from the power supply device to the plasma source. Accordingly, it is possible to prevent failure of the plasma generating device by estimating the junction temperature in real time in a power supply device including a full-bridge resonance type inverter to generate the high-density plasma.

Embodiments according to the present disclosure may be applied to all cases of using a power supply device including a full-bridge resonant inverter including a resonance circuit to provide high-frequency and high-voltage power, in addition to the plasma generating device for generating the plasma.

Figure 2:
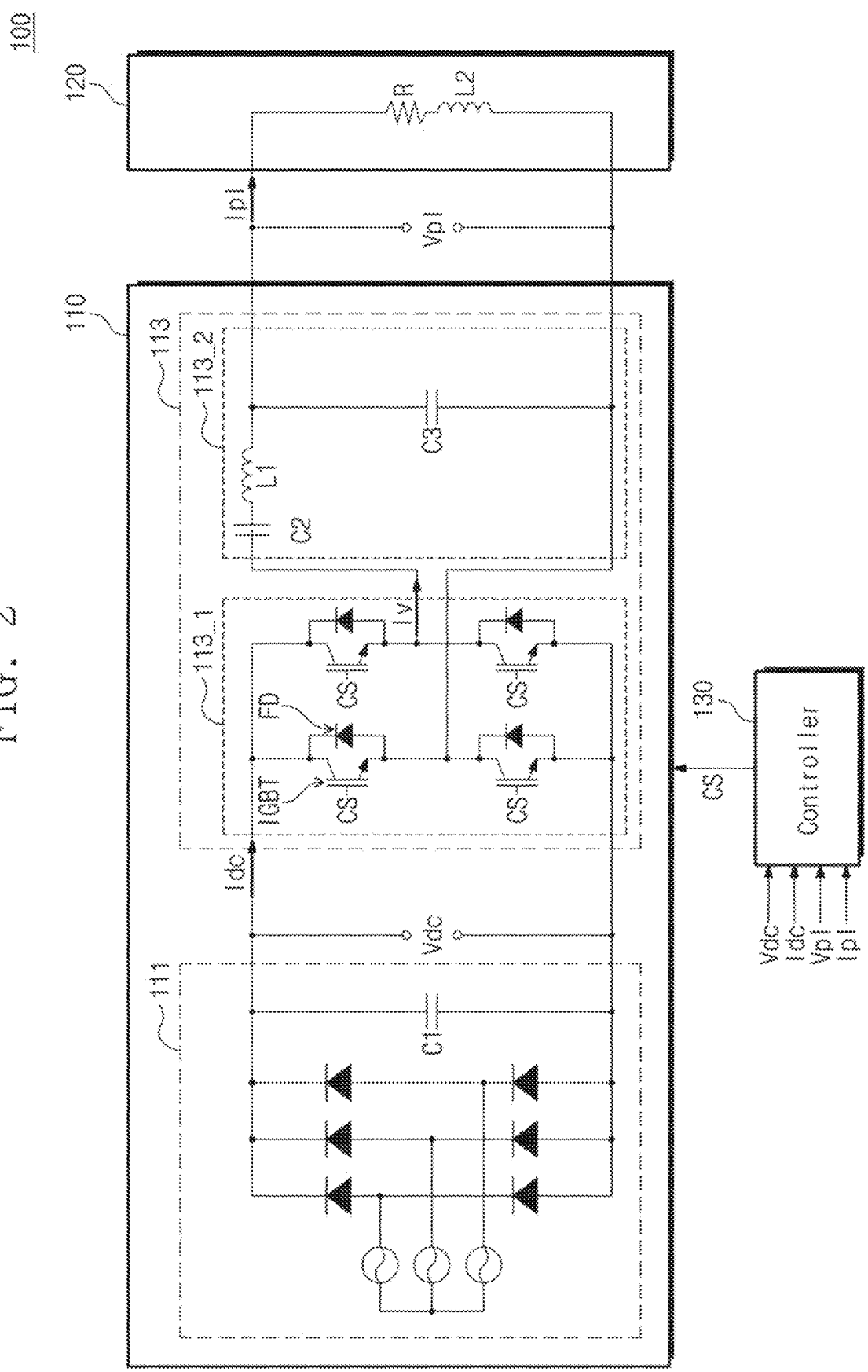
FIG. 2 is a diagram illustrating a plasma generating device of FIG. 1.

FIG. 2 is a diagram illustrating a plasma generating device of FIG. 1.

Referring to FIG. 2, the plasma generating device 100 may include a power supply device 110, a plasma source 120, and a controller 130. The power supply device 110 may be configured to supply power to the plasma source 120.

The power supply device 110 may include a rectifier circuit 111 and an inverter 113.

The rectifier circuit 111 may be configured to generate a DC voltage. For example, the rectifier circuit 111 may be a three-phase rectifier circuit including a three-phase AC power. The rectifier circuit 111 may be configured to rectify the three-phase AC power to output a DC voltage. The DC voltage may include a DC current voltage Vdc and a DC current Idc.

In this specification, the DC current Idc and the DC voltage Vdc generated in the rectifier circuit 111 may be defined as an input DC current and an input DC voltage, respectively.

The rectifier circuit 111 may include a first capacitor C1. The first capacitor C1 may be configured to be charged by the input DC current Vdc output from the rectifier circuit 111. In an embodiment, the first capacitor C1 may be a DC-Link capacitor.

The input DC voltage Vdc and input DC current Idc output from the rectifier circuit 111 may be provided to the inverter 113.

The inverter 113 may be configured to perform a switching operation based on the input DC voltage Vdc and the input DC current Idc to output a device output current Ipl and a device output voltage Vpl. For example, the device output current Ipl may be an alternating current and the device output voltage Vpl may be an alternating voltage. The inverter 113 may include a semiconductor inverter implemented with a semiconductor chip. For example, the inverter 113 may be provided while being mounted inside a semiconductor package.

In this specification, the device output current Ipl may refer to a current output from the power supply device 110 and input to the plasma source 120, and the device output voltage Vpl may refer to power output from the power supply device 110 input to the plasma source 120.

In an embodiment, the inverter 113 may be a full-bridge resonant inverter including a switching circuit 113_1 and a resonance circuit 113_2.

The switching circuit 113_1 may be configured to perform a switching operation based on the input DC current Idc and input DC voltage Vdc to obtain a converted alternating current and a converted alternating current voltage, so as to output an inverted alternating current Iv and an inverted alternating current voltage Vv.

As used herein, the alternating current output from the switching circuit 113_1 may be defined as the inverted alternating current Iv, the alternating current voltage output from the switching circuit 113_1 may be defined as the inverted alternating current voltage Vv, and a frequency of the inverted alternating current Iv may be defined as the switching frequency. Since the frequency of the inverted alternating current is the same as the frequency of the device output current or device output voltage, the switching frequency may also refer to the frequency of the device output current or device output voltage.

The switching circuit 113_1 may include a plurality of switching elements and a plurality of diodes. When each switching element is turned off, ideally no current should flow through the switching element. However, a minute current may flow in the switching device due to inductance components of the circuit around the switching device. Accordingly, a diode may be disposed to prevent current from flowing through the switching element to form a current path around the switching element.

In an embodiment, the switching circuit 113_1 may have a single-phase full bridge structure including four switching elements and four diodes. For example, the switching device may be an insulated gate bipolar transistor (IGBT) element. For example, the diode may be a freewheeling diode (FD).

The switching circuit 113_1 may be configured to output the inverted alternating current power having a switching frequency in response to a gate driving signal applied to a gate terminal of each switching element.

In an embodiment, when the switching frequency has a high frequency (e.g., hundreds of kHz), the inverted alternating current Iv may not be directly measured.

The resonance circuit 113_2 may be configured to amplify an amplitude of the inverted alternating current Iv and an amplitude of the inverted alternating current voltage Vv to output the device output current Ipl and the device output voltage Vpl. For example, the amplitude of the device output current Ipl and the amplitude of the device output voltage Vpl may be several to tens of times greater than the amplitude of the inverted alternating current Iv and the amplitude of the inverted alternating current voltage Vv.

In an embodiment, the resonance circuit 113_2 may include a capacitor and an inductor connected in series to each other. The resonance frequency of the resonance circuit 113_2 may be determined based on capacitance values of the capacitor and inductor.

As the switching frequency becomes closer to the resonance frequency of the resonance circuit 113_2, the inverted alternating current Iv and the inverted alternating current voltage Vv may be amplified to a greater extent.

The device output current Ipl and device output voltage output from the resonance circuit 113_2 may have different phases. In detail, a phase difference between the device output current Ipl and the device output voltage may be non-zero. For example, as the switching frequency becomes further away from the resonant frequency of the resonance circuit 113_2, a phase difference between the inverted alternating current Iv and the inverted alternating current voltage Vv may be greater.

For example, the resonance circuit 113_2 may include a second capacitor C2, a third capacitor C3, and a first inductor L1. For example, the second capacitor C2, the first inductor L1, and the third capacitor C3 may be sequentially connected in series, and both ends of the third capacitor C3 may be connected to an output terminal of the resonance circuit 113_2.

In another embodiment, the resonance circuit 113_2 may further include a plurality of inductors, a plurality of capacitors, and/or a plurality of resistors, and the resonance frequency of the resonance circuit 113_2 may also be determined by the capacitor, inductor, and resistor that compose the circuit.

The device output current Ipl and device output voltage Vpl output from the resonance circuit 113_2 may be input to the plasma source 120.

The plasma source 120 may be configured to generate the plasma based on the device output current Ipl and the device output voltage Vpl. For example, the plasma source 120 may include a ferromagnetic core inductive plasma (FCIP) generator. For example, the plasma source 120 may include a ferromagnetic core and an inductor that are connected in series. As another example, the plasma source 120 may be a remote plasma source (RPS).

The controller 130 may be configured to generate a control signal CS for driving the inverter 113. For example, the control signal CS may include a gate driving signal applied to a gate terminal of the switching element. The controller 130 may control the switching frequency of the switching circuit by controlling the gate driving signal of each switching element of the switching circuit.

The controller 130 may be configured to control the switching frequency of the switching circuit based on sensor information. The sensor information may include values of the input DC voltage, the input DC current, the device output voltage, and the device output current. In an embodiment, the controller 130 may be configured to control the switching frequency such that the values of the device output voltage and device output current become target values. For example, controller 130 may set the switching frequency closer to the resonant frequency of the resonance circuit to further increase the values of the device output voltage and device output current.

Figure 3:
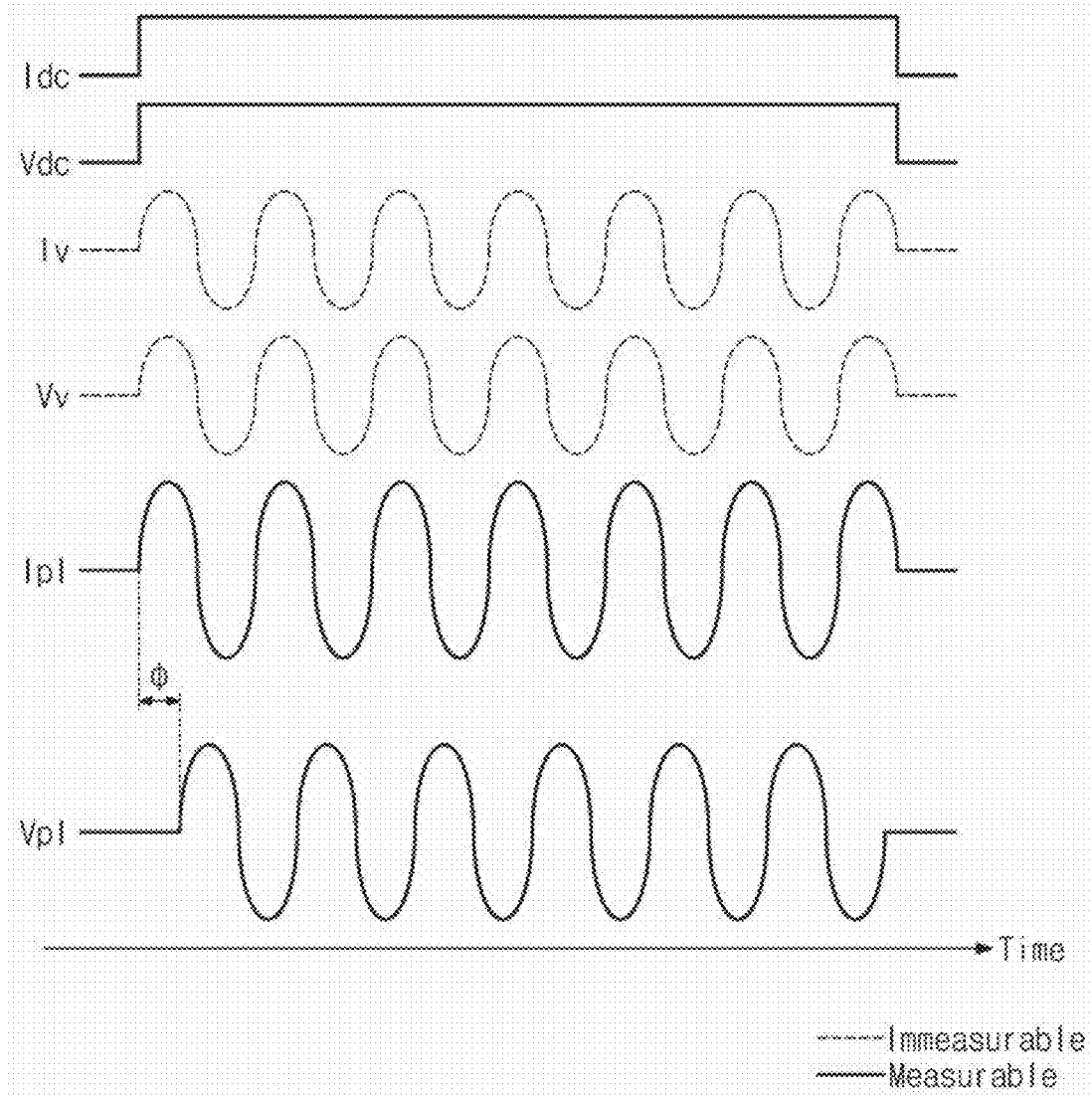
FIG. 3 is a diagram illustrating a current and a voltage measurable, and a current and a voltage unmeasurable, in a plasma generating device of FIG. 2.

FIG. 3 is a diagram illustrating a current and a voltage measurable and a current and a power unmeasurable in a plasma generating device of FIG. 2.

In FIG. 3, when the input DC current Idc and the input DC voltage Vdc are provided for a specified period of time, shapes of the inverted alternating current Iv, the inverted alternating current voltage Vv, the device output current Ipl, and the device output voltage Vpl may be provided as an example.

The input DC current Idc, input DC voltage Vdc, device output current Ipl, and device output voltage Vpl, indicated in solid lines, are measurable, and the inverted alternating current Iv and the inverted alternating current voltage Vv, indicated in dotted lines, are unmeasurable.

The device output voltage has a larger amplitude compared to the inverted alternating current voltage, the device output current has a larger amplitude compared to the inverted alternating current, and there is a phase difference Φ between the device output voltage and the device output current.

Figure 4:
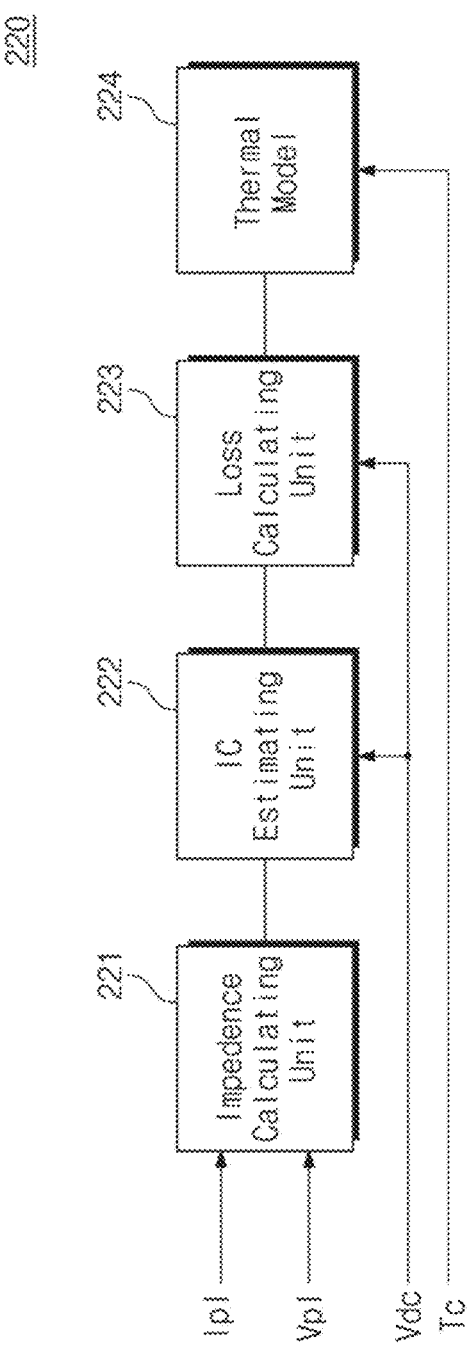
FIG. 4 is a block diagram illustrating an example of a junction temperature estimation device of FIG. 1.
Figure 5:
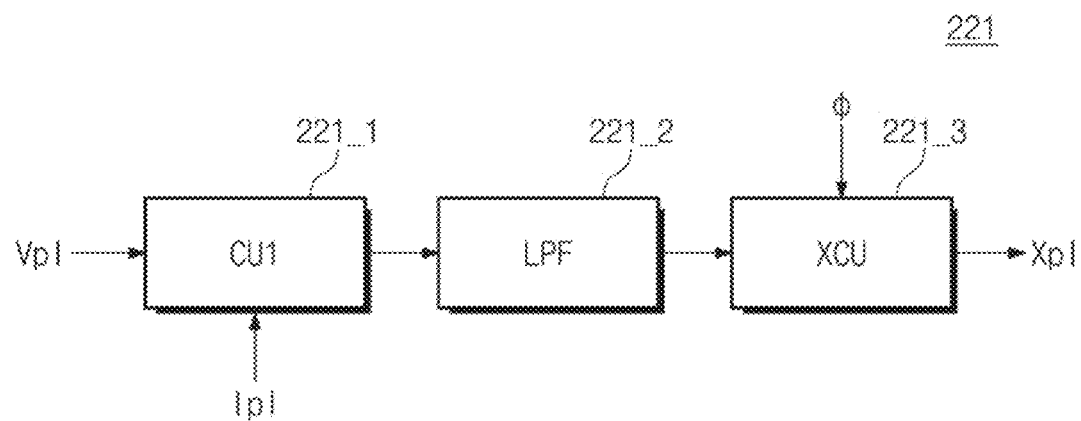
FIG. 5 is a block diagram illustrating an example of an impedance calculating unit of FIG. 4.
Figure 6:
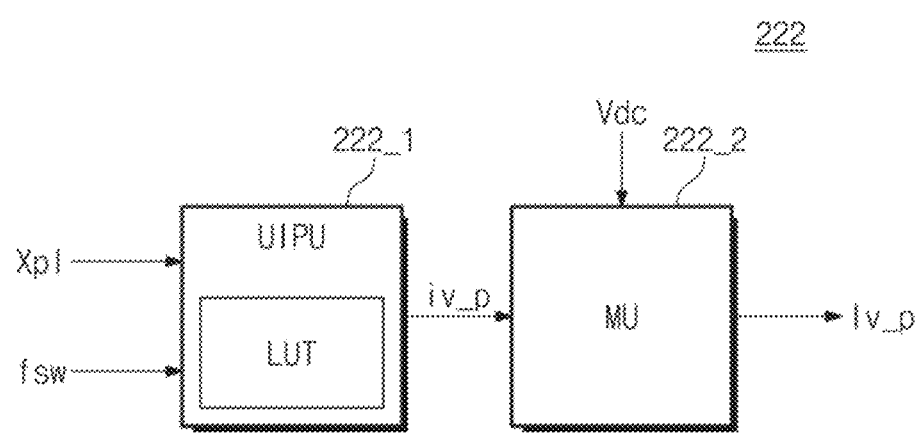
FIG. 6 is a block diagram illustrating an example of an inverted current estimating unit of FIG. 4.
Figure 7:
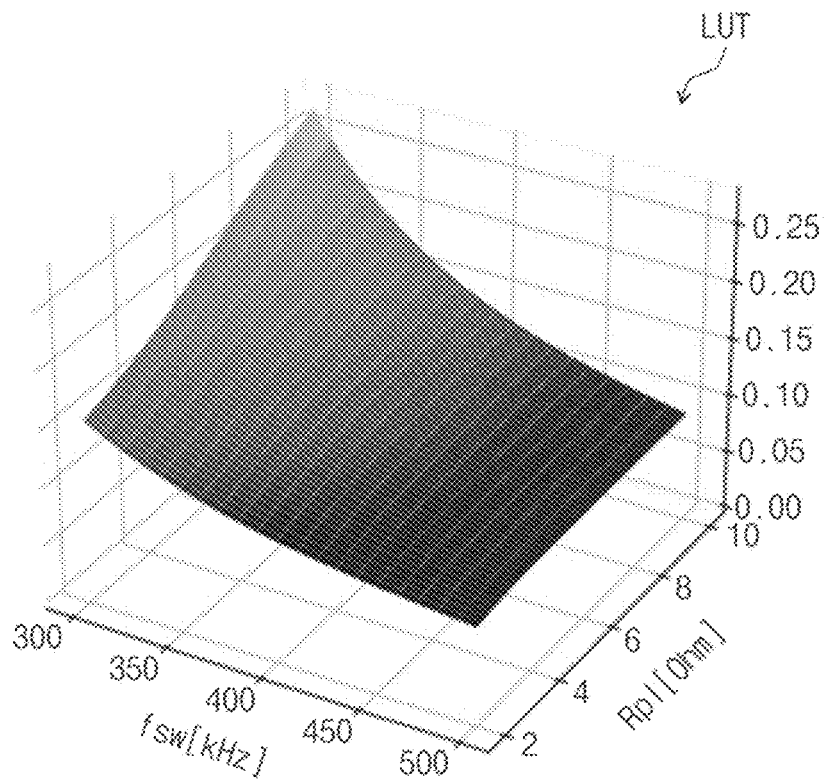
FIG. 7 is a diagram illustrating an example of a two-dimensional lookup table.
Figure 8:
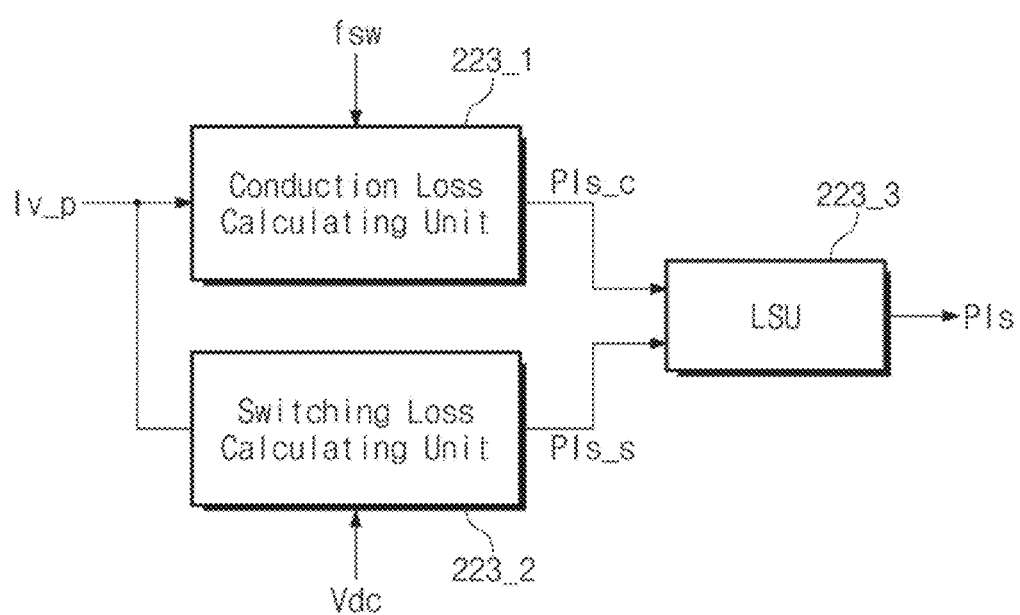
FIG. 8 is a block diagram illustrating an example of a loss calculating unit of FIG. 4.
Figure 9:
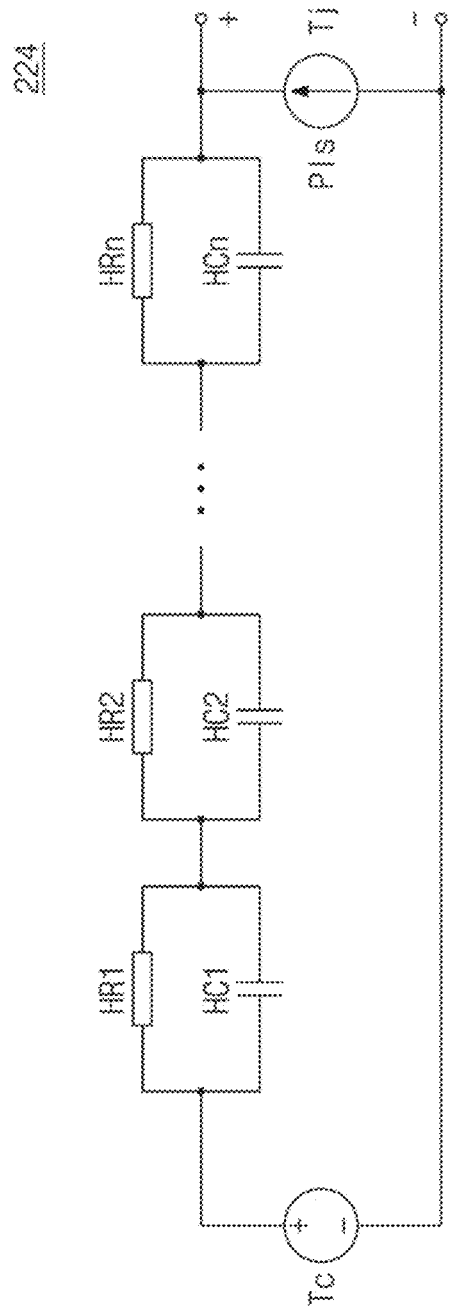
FIG. 9 is a circuit diagram illustrating an example of a thermal model of FIG. 4.
Figure 10:
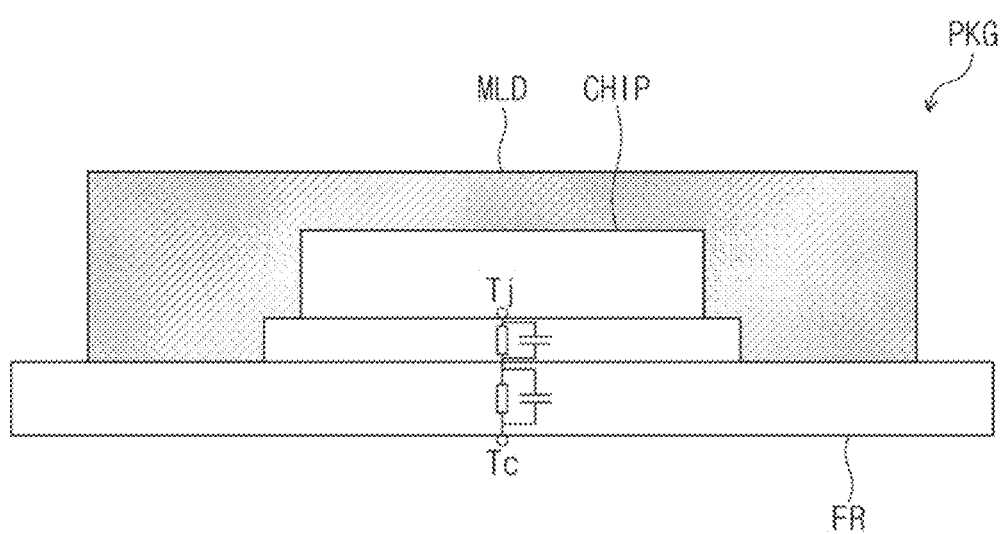
FIG. 10 is a diagram illustrating an example of a semiconductor package.

FIG. 4 is a block diagram illustrating an example of a junction temperature estimation device of FIG. 1. FIG. 5 is a block diagram illustrating an example of an impedance calculating unit of FIG. 4. FIG. 6 is a block diagram illustrating an example of an inverted current estimating unit of FIG. 4. FIG. 7 is a diagram illustrating an example of a two-dimensional lookup table LUT. FIG. 8 is a block diagram illustrating an example of a loss calculating unit of FIG. 4. FIG. 9 is a circuit diagram illustrating an example of a thermal model of FIG. 4. FIG. 10 is a diagram illustrating an example of a semiconductor package.

Referring to FIG. 4, the junction temperature estimation device 220 may be configured to receive sensor information from the plasma generating device 100. The sensor information may include values of the input DC voltage, the device output voltage, and the device output current. The managing device 200 may be configured to receive a case temperature of the semiconductor package in which inverter circuits are integrated. The managing device 200 may include a temperature measuring device for measuring the case temperature, but the temperature measuring device may be provided outside the managing device 200.

The junction temperature estimation device 220 may be configured to estimate a junction temperature based on the case temperature and the values of the input DC voltage, the device output voltage, and the device output current. In an embodiment, the junction temperature estimation device 220 may be configured to calculate an inverted current estimate value Iv_p by estimating a current output from the switching circuit 113_1 based on the device output current Ipl and the device output voltage Vpl, and to estimate a junction temperature based on the inverted current estimate value Iv_p and the case temperature.

The junction temperature estimation device 220 may include an impedance calculating unit 221, an inverted current estimating unit 222, a loss calculating unit 223, and a thermal model 224.

The impedance calculating unit 221 may be configured to calculate an output impedance Xpl based on the device output voltage Vpl, the device output current Ipl, and the phase difference Φ. The output impedance Xpl may refer to an impedance of the device (e.g., the plasma source 120) connected to the output terminal of the inverter 113.

Referring to FIG. 5, the impedance calculating unit 221 may include a first computational unit 221_1, a low-pass filter 221_2, and a reactance computational unit 221_3.

The first computational unit 221_1 may be configured to calculate a ratio of the device output voltage Vpl to the device output current Ipl, as illustrated in Equation 1 below.

$$\text{ratio} = \left|\frac{V_{pl}}{I_{pl}}\right| \qquad \text{Equation 1}$$

The low-pass filter 221_2 may be configured to filter high-frequency components induced in the device output voltage Vpl and the device output current Ipl. In an embodiment, by including the low-pass filter 221_2, noise may be removed to improve the stability and accuracy of the junction temperature estimate value, which will be described later.

The reactance computational unit 221_3 may be configured to calculate the output impedance Xpl as in Equation 2 below, based on the ratio and phase difference Φ of the device output voltage Vpl to the device output current Ipl output from the first computational unit 221_1.

$$X_{pl} = \cos(\phi) \times \left|\frac{V_{pl}}{I_{pl}}\right| + j \times \sin(\phi) \times \left|\frac{V_{pl}}{I_{pl}}\right| = R_{pl} + j\omega L_{pl} \qquad \text{Equation 2}$$

Referring to Equation 2, Rpl may mean a resistance component as the real part of the output impedance Xpl, and ωLpl may mean an inductive reactance component as the imaginary part of the output impedance Xpl.

Referring again to FIG. 4, the output impedance Xpl calculated by the reactance computational unit 221_3 may be provided to the inverted current estimating unit 222.

The inverted current estimating unit 222 may be configured to output the inverted current estimate value Iv_p based on the output impedance Xpl and a switching frequency fsw. The switching frequency fsw may be a value set in the controller 130 of the plasma generating device 100. The inverted current estimate value Iv_p may mean an estimate value of the inverted alternating current output from the switching circuit 113_1 of the plasma generating device 100.

Referring to FIG. 6, in an embodiment, the inverted current estimating unit 222 may include a unit inverted current estimate value outputting unit 222_1 and a product computational unit 222_2.

The unit inverted current estimate value outputting unit 222_1 may be configured to output a unit inverted current estimate value iv_p using a lookup table LUT based on the output impedance Xpl. The unit inverted current estimate value iv_p may mean a value of the inverted alternating current estimated to be output from the switching circuit 113_1 when the input DC voltage Vdc is a unit voltage (e.g., 1 V).

The look up table LUT may include values predicted through simulation based on the circuit of the plasma generating device 100.

In an embodiment, the lookup table LUT may be a two-dimensional lookup table LUT to which the unit inverted current estimate value iv_p is assigned based on two variables, as illustrated in FIG. 7. For example, in the lookup table LUT, the unit inverted current estimate value iv_p may be assigned by using the resistance component of the output impedance Xpl and the switching frequency fsw as variables.

In another embodiment, the lookup table LUT may be a three-dimensional lookup table LUT in which the unit inverted current estimate value iv_p is assigned based on three variables. For example, in the lookup table LUT, the unit inverted current estimate value iv_p may be assigned by using the switching frequency fsw, the resistance component of the output impedance Xpl, and the inductive reactance component of the output impedance Xpl as variables.

The product computational unit 222_2 may be configured to output the inverted current estimate value Iv_p based on the unit inverted current estimate value iv_p and the input DC voltage Vdc. For example, the product computational unit 222_2 is configured to output the inverted current estimate value Iv_p by multiplying the unit inverted current estimate value iv_p by the value of the input DC voltage Vdc, as illustrated in Equation 3 below.

$$\text{Iv\_p} = V_{dc} \times \text{iv\_p}(R_{pl}, f_{sw}) \qquad \text{Equation 3}$$

In Equation 3, iv_p ($R_{pl}$, $f_{sw}$) means the unit inverted current estimate value iv_p assigned to the two variables, the resistance component $R_{pl}$ and the switching frequency fsw, in the lookup table LUT.

Referring again to FIG. 4, the loss calculating unit 223 may be configured to calculate a loss estimate value Pls based on the inverted current estimate value Iv_p and the input DC voltage Vdc. The loss estimate value Pls may mean an estimated value of power lost in the switching circuit 113_1 of the plasma generating device 100.

Referring to FIG. 8 together, the loss calculating unit 223 may include a conduction loss calculating unit 223_1, a switching loss calculating unit 223_2, and a loss summing unit 223_3.

The conduction loss calculating unit 223_1 may be configured to calculate a conduction loss value Pls_c based on the inverted current estimate value Iv_p and the switching frequency fsw. In an embodiment, the conduction loss calculating unit 223_1 may be configured to calculate the conduction loss value Pls_c as illustrated in Equation 4 below.

$$\text{Pls\_c} = 0.5 \text{Iv\_p}^2 * Rdson + fsw * Tdead * \text{Iv\_p} * Vfdiode \qquad \text{Equation 4}$$

In Equation 4, Rdson is a value related to a drain-source resistance in the turn-on state of a MOSFET, Tdead is a value related to the dead time of the inverter, and Vfdiode is a value related to a reverse diode forward voltage. The Rdson and Tdead are design variables and are values set at an inverter circuit design stage, and Vfdiode is a value set by the controller 130.

The switching loss calculating unit 223_2 may be configured to calculate a switching loss value Pls_s based on the inverted current estimate value Iv_p and the input DC voltage Vdc. In an embodiment, the switching loss calculating unit 223_2 may be configured to calculate the switching loss value Pls_s as illustrated in Equation 5 below.

$$\text{Pls\_s} = (Eoff@nom/Tsw) \times (\text{Iv\_p}/Inom) \times (Vdc/Vnom) \qquad \text{Equation 5}$$

In Equation 5, Eoff@nom is a value related to a switching loss in nominal operation when the switching element is tested, Tsw is a value related to a switching period corresponding to the switching frequency, Inom is a value related to a switching loss reference current, and Vnom is a value related to a switching loss reference voltage. The Eoff@nom, Tsw, Inom, and Vnom may be arbitrarily set as design variables.

The loss summing unit 223_3 may be configured to output the loss estimate value Pls by adding the conduction loss value Pls_c and the switching loss value Pls_s.

Referring again to FIG. 4, the thermal model 224 may be configured to calculate a junction temperature based on the loss estimate value Pls and the case temperature. In an embodiment, the thermal model 224 may be configured to estimate the junction temperature based on a thermal circuit model using the loss estimate value Pls as the input current and the case temperature as the input power.

Referring to FIG. 9, in an embodiment, the thermal model 224 may be a thermal circuit model including thermal resistance and thermal capacitance. The thermal model 224 may include a plurality of thermal resistors HR1 to HRn and a plurality of thermal capacitors HC1 to HCn. As an example, the thermal model 224 may be a series thermal model in which the plurality of thermal resistors are connected in series to each other. A pair of thermal resistors and thermal capacitors may be connected in parallel.

The resistance value of the thermal resistor may be inversely related to the thermal conductivity of a material, and the thermal capacitance may correspond to the thermal capacitance of the material.

The number of thermal resistors and the number of thermal capacitors in the thermal model 224 may be determined based on a material composition of a package containing the inverter of the present disclosure.

Referring to FIG. 10, a semiconductor package PKG may be provided as an example. The semiconductor package PKG may include a semiconductor chip "CHIP" including a switching element. The semiconductor chip "CHIP" may be provided on a frame FR, and a molding film MLD may be provided to surround the semiconductor chip "CHIP".

Heat may be generated in an integrated circuit (e.g., a circuit including the inverter of the present disclosure) inside the semiconductor chip "CHIP", and heat may be emitted to the outside through materials composing the semiconductor package PKG. A circuit form of the thermal model 224 may be determined based on the arrangement of the material disposed in a thermal transfer path, and values of the thermal resistance and thermal capacitance may be determined based on the type of material disposed in the thermal transfer path.

In an example, the junction temperature may be a temperature at the switching element inside the semiconductor chip "CHIP" of the semiconductor package PKG, and the case temperature may be a temperature of the surface of the frame FR exposed to the outside of the semiconductor package PKG. The case temperature may be measured directly, and in the present disclosure, the thermal model 224 may be configured to calculate the junction temperature through a thermal circuit model designed according to the arrangement and type of the material disposed in the thermal transfer path inside the semiconductor package PKG.

According to an embodiment of the present disclosure, a plasma generating system is provided that manages a plasma generating device by estimating a junction temperature of a resonant inverter in real time.

According to an embodiment of the present disclosure, a junction temperature estimation device capable of estimating a junction temperature of a resonant inverter in real time is provided.

According to an embodiment of the present disclosure, a managing device for managing a power supply device by estimating a junction temperature of the power supply device including a full bridge resonant inverter in real time is provided.

At least one of the components, elements, modules, units, or the like (collectively "components" in this paragraph) represented by a block or an equivalent indication (collectively "block") in the above embodiments including the drawings, for example, the managing device, the controller, the junction temperature estimator, the impedance calculating unit, the IC estimating unit, the loss calculating unit, and the thermal model, or the like, may be physically implemented by analog and/or digital circuits including one or more of a logic gate, an integrated circuit, a microprocessor, a microcontroller, a memory circuit, a passive electronic component, an active electronic component, an optical component, and the like, and may be driven by software and/or firmware (configured to perform the functions or operations described herein) stored in one or more internal or external memories. Each block of the embodiments may be physically separated into two or more interacting and discrete blocks. Likewise, the blocks of the embodiments may be physically combined into more complex blocks.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. Therefore, the scope of the present disclosure should not be limited to the above-described embodiments and should be defined by not only the claims to be described later, but also those equivalent to the claims of the present disclosure.

What is claimed is:

1. A plasma generating system comprising:
   a resonant inverter comprising a switching circuit and configured to generate a device output current and a device output voltage, and to have a switching frequency based on an input DC current and an input DC voltage;
   a plasma source configured to generate a plasma based on the device output current and the device output voltage;
   a controller configured to control the switching frequency of the resonant inverter based on a value of the input DC current, a value of the input DC voltage, a value of the device output current, and a value of the device output voltage; and
   a junction temperature estimator configured to:
      estimate a current output from the switching circuit based on the value of the input DC voltage, the value of the device output current, and the value of the device output voltage,
      generate an inverted current estimate value, and
      estimate a junction temperature of the switching circuit based on the inverted current estimate value.

2. The plasma generating system of claim 1, further comprising a power supply configured to generate the input DC current and the input DC voltage,
   wherein the resonant inverter is further configured to:
      convert the input DC voltage and the input DC current into an alternating current and an alternating current voltage, and
      output the device output current and the device output voltage, and
   wherein the plasma source comprises a ferromagnetic core inductive plasma source.

3. The plasma generating system of claim 2,
   wherein the switching circuit is configured to:
      convert the input DC current into the alternating current,
      output an inverted alternating current,
      convert the input DC voltage into the alternating current voltage, and
      output an inverted alternating current voltage,
   wherein the resonant inverter further comprises a resonance circuit configured to:
      amplify the inverted alternating current and the inverted alternating current voltage, and
      output the device output current and the device output voltage, and
   wherein the switching circuit comprises a single-phase full bridge structure.

4. The plasma generating system of claim 1, wherein the junction temperature estimator comprises:
   an impedance calculating unit configured to obtain an output impedance based on the device output current and the device output voltage;
   an inverted current estimating unit configured to output the inverted current estimate value based on the output impedance and the switching frequency of the device output current;
   a loss calculating unit configured to obtain a loss estimate value based on the inverted current estimate value; and
   a thermal model configured to obtain the junction temperature based on the loss estimate value.

5. The plasma generating system of claim 4, wherein the impedance calculating unit is further configured to obtain the output impedance based on a ratio of the device output voltage to the device output current and a phase difference between the device output voltage and the device output current.

6. The plasma generating system of claim 4, wherein the inverted current estimating unit is further configured to output the inverted current estimate value using a lookup table based on the output impedance and the switching frequency.

7. The plasma generating system of claim 6, wherein a unit inverted current estimate value is assigned from the lookup table based on a resistance component of the output impedance and the switching frequency.

8. The plasma generating system of claim 4, wherein the loss calculating unit comprises:
 a conduction loss calculating unit configured to obtain a conduction loss value based on the inverted current estimate value and the switching frequency;
 a switching calculating unit configured to obtain a switching loss value based on the inverted current estimate value; and
 a loss summing unit configured to add the conduction loss value and the switching loss value to output the loss estimate value.

9. The plasma generating system of claim 4, wherein the thermal model is further configured to estimate the junction temperature based on a thermal circuit model using the loss estimate value as an input current and a case temperature of a power supply device which includes the resonant inverter as an input power.

10. The plasma generating system of claim 9, wherein the thermal model comprises a series thermal model in which a plurality of thermal resistors are connected in series.

11. A junction temperature estimation device configured to estimate a junction temperature of a power supply device including a resonant inverter, the junction temperature estimation device comprising:
 at least one processor;
 at least one memory storing at least one instruction, which when executed by the at least one processor, causes the junction temperature estimation device to:
 generate an inverted current estimate value by estimating a current output by a switching circuit of the resonant inverter based on a value of a device output current generated by the resonant inverter and a value of a device output voltage generated by the resonant inverter, and
 estimate the junction temperature of the switching circuit based on the inverted current estimate value.

12. The junction temperature estimation device of claim 11, wherein the at least one instruction, when executed by the at least one processor, further causes the junction temperature estimation device to:
 obtain an output impedance based on the device output current and the device output voltage,
 output the inverted current estimate value based on the output impedance and a switching frequency of the device output current,
 obtain a loss estimate value based on the inverted current estimate value, and
 obtain the junction temperature based on the loss estimate value.

13. The junction temperature estimation device of claim 12, wherein the at least one instruction, when executed by the at least one processor, further causes the junction temperature estimation device to:
 obtain the output impedance based on a ratio of the device output voltage to the device output current and a phase difference between the device output voltage and the device output current.

14. The junction temperature estimation device of claim 12, wherein the at least one instruction, when executed by the at least one processor, further causes the junction temperature estimation device to:
 output the inverted current estimate value using a lookup table based on the output impedance and the switching frequency.

15. The junction temperature estimation device of claim 12, wherein the at least one instruction, when executed by the at least one processor, further causes the junction temperature estimation device to:
 obtain a conduction loss value based on the inverted current estimate value and the switching frequency,
 obtain a switching loss value based on the inverted current estimate value, and
 add the conduction loss value and the switching loss value to obtain the loss estimate value.

16. The junction temperature estimation device of claim 12, wherein the at least one instruction, when executed by the at least one processor, further causes the junction temperature estimation device to:
 estimate the junction temperature based on a thermal circuit model using the loss estimate value as an input current and a case temperature of the power supply device as an input power.

17. A plasma generating system comprising:
 a plasma generating device comprising a plasma source configured to generate a plasma based on a device output current and a device output voltage input from a power supply device; and
 a managing device configured to:
 generate an inverted current estimate value by estimating a current output from a switching circuit included in a resonant inverter of the power supply device based on a value of the device output current and a value of the device output voltage,
 estimate a junction temperature of the switching circuit based on the inverted current estimate value, and
 perform a management operation on the plasma generating device based on the estimated junction temperature.

18. The plasma generating system of claim 17, wherein the plasma source comprises a ferromagnetic core inductive plasma generator.

19. The plasma generating system of claim 17, wherein the plasma source comprises a remote plasma source.

20. The plasma generating system of claim 17, wherein the managing device is further configured to generate the inverted current estimate value using a lookup table.

* * * * *